United States Patent
Woof

[19]
[11] Patent Number: 5,403,097
[45] Date of Patent: Apr. 4, 1995

[54] THREE PART GLIDE ON SOLID BEARING DRAWER SLIDE

[75] Inventor: Michael S. Woof, Guelph, Canada

[73] Assignee: Waterloo Furniture Components, Ltd., Kitchener, Canada

[21] Appl. No.: 141,034

[22] Filed: Oct. 26, 1993

[30] Foreign Application Priority Data

May 13, 1993 [CA] Canada ................. 2096189

[51] Int. Cl.6 .................. F16C 29/02; A47B 88/16
[52] U.S. Cl. ......................... 384/20; 384/23
[58] Field of Search ............. 384/17, 18, 20, 21, 384/22, 23, 44

[56]  References Cited
U.S. PATENT DOCUMENTS

| | | |
|---|---|---|
| 1,005,055 | 10/1911 | Miller . |
| 2,295,697 | 9/1942 | Sulentic . |
| 3,059,978 | 10/1962 | Fall . |
| 3,126,230 | 3/1964 | Spicer, Jr. ................. 384/17 |
| 3,185,530 | 5/1965 | Reiss, Sr., et al. .......... 384/21 |
| 3,975,063 | 8/1976 | Mahotka et al. ............ 384/18 |
| 4,440,461 | 4/1984 | Powell et al. . |
| 4,712,927 | 12/1987 | Arrendiell et al. .......... 384/23 |
| 4,759,341 | 7/1988 | McFarland ................. 384/23 X |
| 4,955,160 | 9/1990 | Rock . |
| 5,090,787 | 2/1992 | Harley ..................... 384/20 X |
| 5,209,572 | 5/1993 | Jordan .................... 384/18 |

FOREIGN PATENT DOCUMENTS 67790  5/1944  Norway .

Primary Examiner—Thomas R. Hannon
Attorney, Agent, or Firm—Fisher, Christen & Sabol

[57]  ABSTRACT

The invention lies in a solid bearing drawer slide with an innovative reinforced plastic intermediate channel resulting in smooth, silent operation. The new low cost slide has the action and durability of a ball bearing and drawer slide while costing a fraction of the price to make. The plastic intermediate slide is made of mixtures of new innovative durable plastics. A lubricant supplied between bearing surfaces produces smooth sliding action.

9 Claims, 4 Drawing Sheets

Section A-A

THREE PART GLIDE ON SOLID BEARING DRAWER SLIDE

DISCLOSURE

This invention relates to drawer slides, and more particularly to telescoping three-component type drawer slides.

BACKGROUND

In common usage today are drawer slides which consist of an outer, an intermediate, and an inner channel having friction reducing ball bearings both between the outer cabinet channel and the intermediate channel as well as between the intermediate channel and the inner drawer channel. Such slides also have ball retainers. These channel slides are particularly durable and are used in situations where the load factor is considerable, such as file cabinets. These channel slides are reliable but are quite costly to manufacture. In addition, they take up a fair amount of space in the cabinet.

Less expensive slides are available and are used in less rigorous applications such as drawers for small tool chests, or other applications. An example of such a slide is shown in U.S. Pat. No. 2,295,697. In this particular type of application an intermediate slide or floating member is constructed from two pieces of stamped metal having out-turned flanges, the two pieces of metal being riveted together. These slides are less expensive but less durable as there is considerable wear because of the metal to metal interface. In addition, the slides are noisy, and not suitable for office or home furniture.

Therefore, there exists a need for a low cost, simplified drawer slide which is capable of long wear and silent operation as well as having considerable load capabilities.

Prior to the development of the new polymeric alloys of plastics and mixtures of plastics, the development of such a slide appeared impossible. The inventor, however, of the present invention, has constructed a one-piece integrally molded elongate plastic intermediate slide which acts as a solid bearing. During experimentation of new slides it was discovered, unknown to the inventor or others, that some of the new space-age plastics such as RYNITE®, which when integrally molded, have surfaces which act as bearing surfaces. When a lubricant is added, a hydro effect is produced and friction between the outer slide, the inner slide, and the intermediate slide is minimized, producing an extremely smooth, quiet, durable drawer slide.

It is therefore an object of the present invention to produce a smooth running, quiet, extremely durable, low friction and low cost drawer slide.

SUMMARY OF THE INVENTION

The present invention provides a three-part drawer slide comprising: an elongate outer channel adapted to be affixed to a cabinet wall; an elongate inner channel adapted to be affixed to a drawer; said channel members being identical to one another in dimension; an elongate integrally molded rigid plastic central glide; said central glide including an upper bearing surface and a lower bearing surface extending the length of said glide; each of said upper bearing surface and said lower bearing surface of said central glide comprising a single longitudinal central recess extending the length of said glide between longitudinal convex ridges; a portion of said glide lying between said upper bearing surface and said lower bearing surface comprising a web; said web being reinforced by a plurality of ribs; each of said outer and inner channels including upper and lower curvilinear in-turned flanges having an inner concave portion configured to said convex ridges; said upper and lower flanges being adapted, in operation, to directly matingly and slidably engage, respectively, said recess on said upper bearing surface and said recess on said lower bearing surface of said central glide. In cross section, the central glide may have a substantially X configuration or substantially Z configuration.

In a first embodiment the intermediate channel is made from a reinforced plastic which offers smooth and silent operation. The low profile 26 mm with 12.7 mm side spacing and full extension creates an ideal slide for cabinets, desks and kitchen drawers. In the simplest version, the outer and inner slides are almost identical, with the exception of mounting holes and limiting stop tabs. When viewed in cross-section, the two have in-turned curvilinear flanges which are of equal width, length and thickness. The central reinforced plastic intermediate channel or glide is, when viewed in cross-section, Z-shaped, having upper and lower bearing surfaces, each with a longitudinal recess that extends the entire length of the glide. The curvilinear flanges of the outer and inner slides matingly engage the bearing surfaces, and slide thereon in a telescoping manner. The friction created is minimal and the slide has, consequently, long life under fairly rigorous load conditions.

Other alternative embodiments of the slide in question include central glides which are either hollow, or semi-hollow, and which are X-shaped. It is submitted that all embodiments of the invention are considered to be part of the invention so long as the central glide is made of an integrally molded space-age type plastic and serves to operate as a solid bearing for the outer and inner slides.

BRIEF DESCRIPTION OF THE DRAWINGS

The invention will be described in greater detail in conjunction with the following drawings wherein.

DETAILED DESCRIPTION OF THE INVENTION

Figure 1:
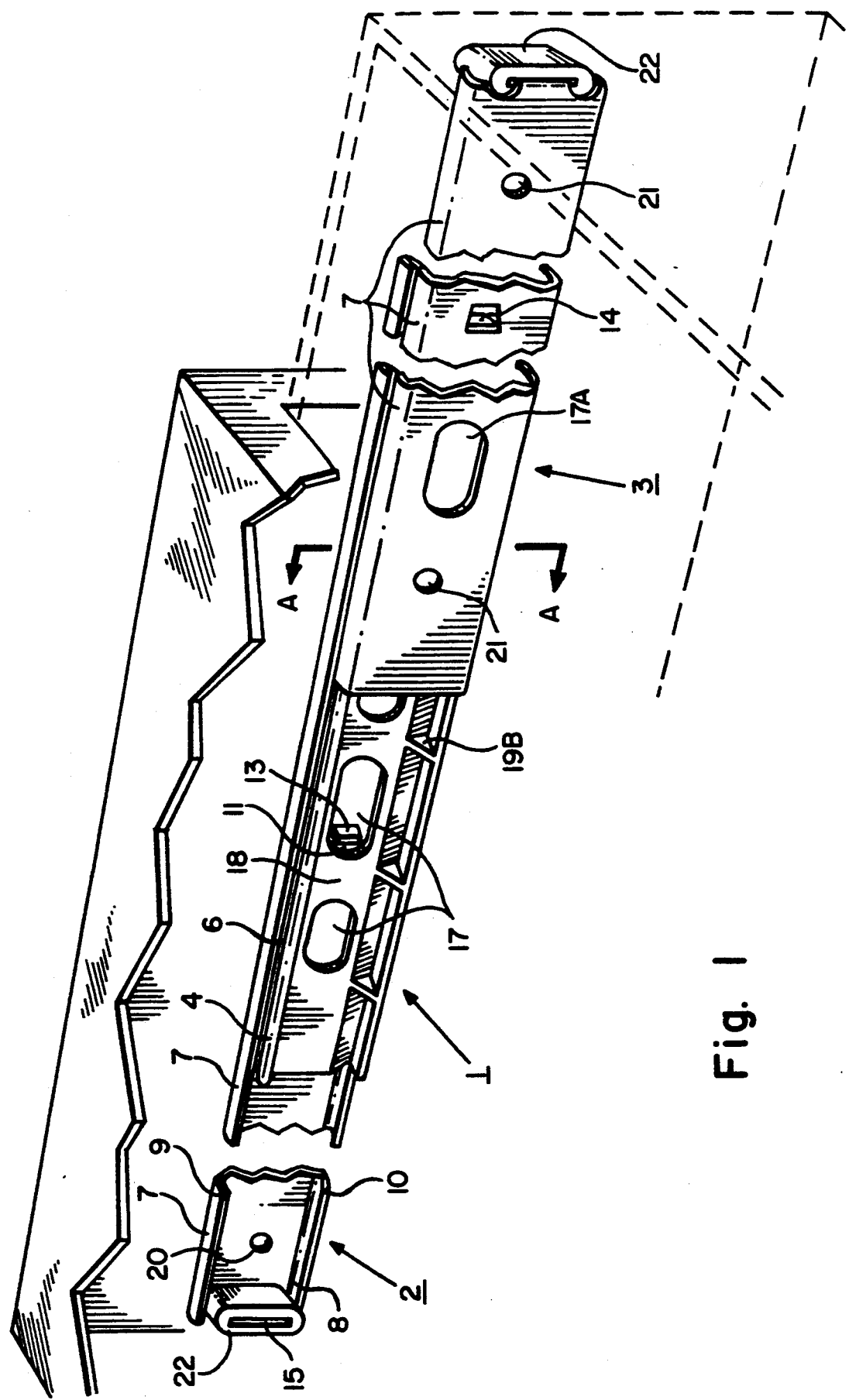
FIG. 1 is a perspective view of the drawer slide of the present invention with the drawer in a partially open position.

In FIG. 1, the intermediate solid bearing glide member 1 is slidably maintained between cabinet outer slide member 2 and drawer inner slide member 3.

Figure 2:
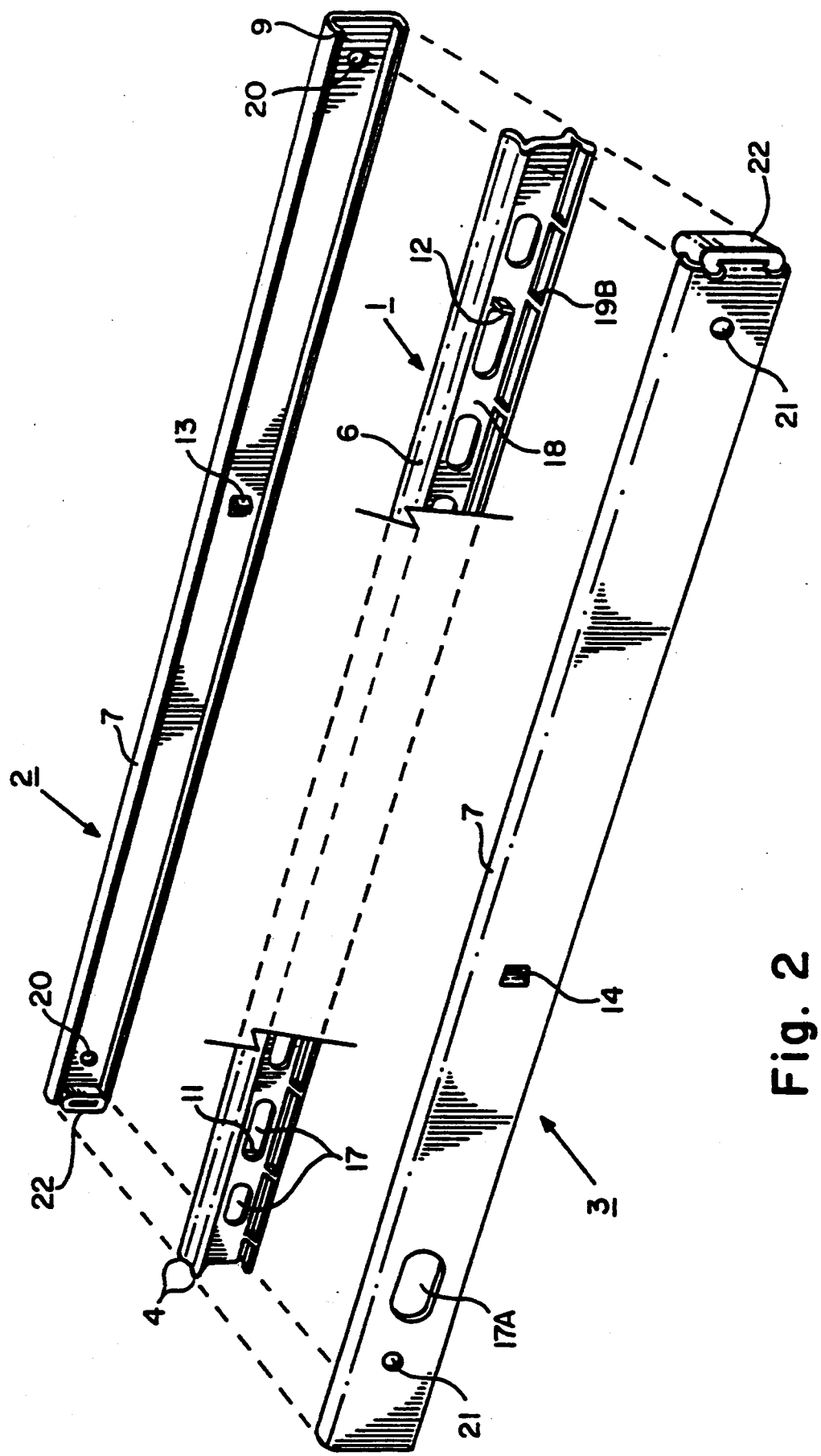
FIG. 2 is an exploded view of the drawer slide of the present invention.
Figure 3:
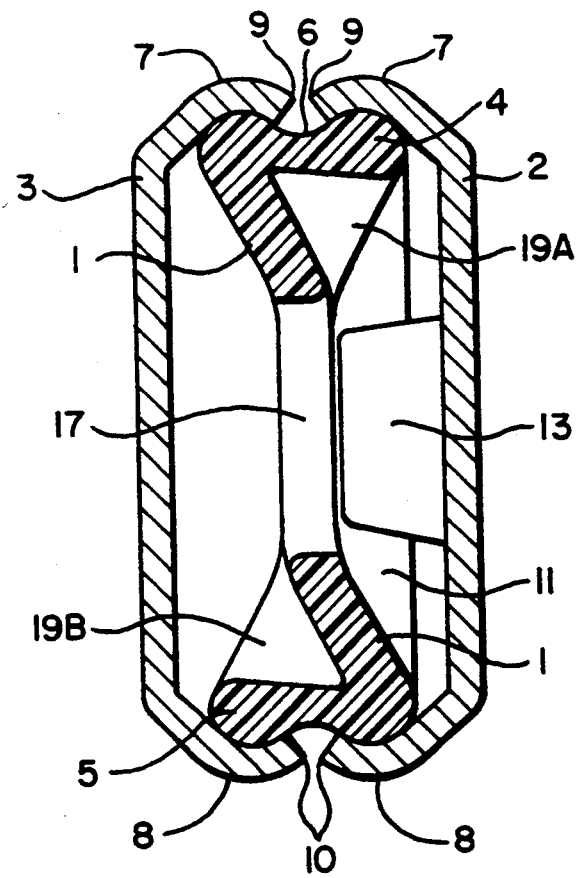
FIG. 3 is a cross-section A—A taken from FIG. 1.

In FIGS. 1, 2 and 3, the top portion of the intermediate slide member 1 has a widened bearing surface, shown generally as 4. In addition, there is a lower widened bearing surface shown generally as 5. The intermediate solid bearing glide member 1 is substantially Z-shaped in cross-section. The upper bearing surface 4 and lower bearing surface 5 both have a centralized recess shown as 6 which runs the entire length of the glide.

The cabinet channel 2 and drawer channel 3 have curvilinear in-turned upper side flanges shown as 7. These terminate as hooked end portions shown as 9. Similarly, the lower portion of cabinet slide 2 and drawer slide 3 have curvilinear in-turned flanges 8, terminating at hooked portions 10. These flanges 7 and 8 are adapted to slidingly engage bearing surfaces and 5, respectively, while hooked portions 9 and 10 are adapted to lie adjacent to one another in recesses 6, thus preventing the slide components from disassembling. To limit outward movement of the drawer, one portion of the web 18 of intermediate glide 1 shown as 11 projects laterally outwardly from the web 18 to engage inwardly turned metal tab 13 on cabinet drawer slide 2. Similarly, as seen in FIG. 2, a second lateral projection 12 projects outwardly on the opposite side of glide 1 from the web 18 to engage tab 14, projecting inwardly from drawer slide channel 3.

Cabinet channel 2 is equipped with a turned-in end flange 15 which is covered by a rubber bumper 22 acting as an end stop to limit inner movement of the drawer. Similarly, drawer channel flange 3 is equipped with an in-turned end flange, not shown, on the opposite end of the slide to similarly limit inward movement.

Central glide member 1 is constructed with a number of apertures 17 spaced apart along web 18. These apertures aid in mounting the cabinet channel slide 2 and drawer slide 3 to the respective cabinet and drawer slide walls. Central glide member 1 is also equipped with a number of lower reinforcing rib projections 19B and upper reinforcing rib projections 19A.

Outer slide member 2 is equipped with a plurality of mounting apertures 20, adapted to facilitate a screw or other fastening means. Similarly, inner channel slide member 3 is equipped with similar mounting apertures 21.

In operation, as a drawer is pulled outwardly, drawer slide 3 moves outwardly with flanges 7 and 8 slidably engaging bearing surfaces 4 and 5. Cabinet outer channel 2 remains stationary and central glide member 1 moves outwardly until a point where lateral projection 11 abuts in-turned flange 13. Thereafter drawer channel 14 continues to move outwardly with both cabinet channel 2 and central glide member 1 remaining stationary until in-turned flanged projection 14 contacts lateral projection 12 on central glide member 1.

Figure 4:
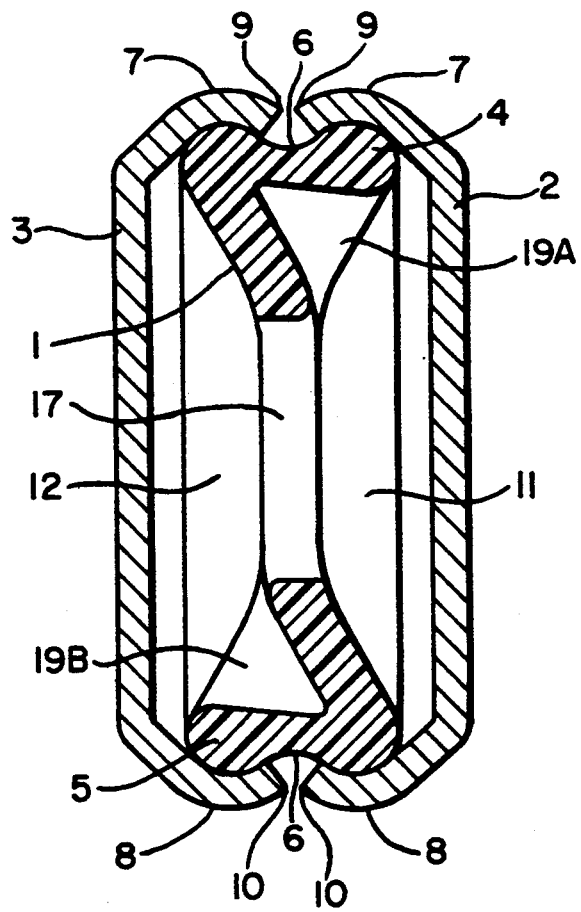
FIG. 4 is a cross-section of a preferred embodiment of the invention with the drawer in a closed position, and the end flange removed.

FIG. 4 is a typical cross-section of the first embodiment of the invention similar to that shown in FIGS. 1, 2 and 3. However, FIG. 4 is a cross-section as seen from the outer end of the drawer slide with end flanges removed. Lateral projections 11 and 12, one on either side of web 18, are visible.

Figure 5:
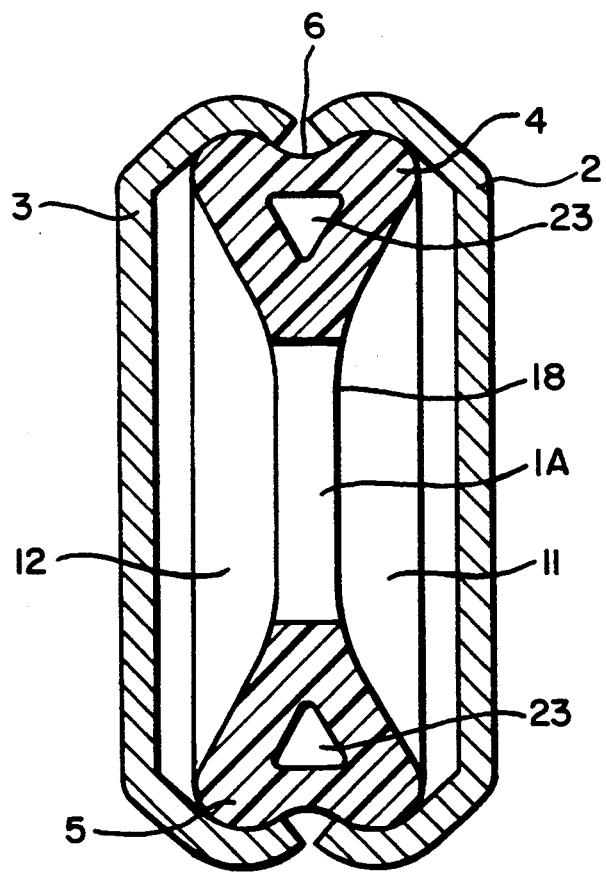
FIG. 5 is a cross-section of an alternative embodiment of the invention.

FIG. 5 is an alternative embodiment of the invention wherein the central glide member 1A, in cross-section, is X-shaped rather than Z-shaped. Ribs 19A and 19B are not necessary in this embodiment. In order to reduce weight, apertures 23, which are open-ended and extend throughout the length of the central glide member 1, are used.

Figure 6:
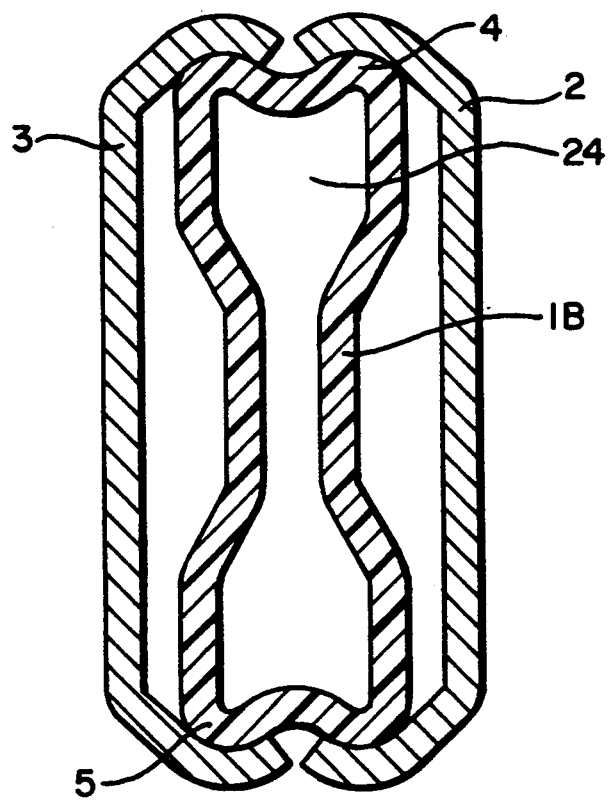
FIG. 6 is a cross-section of a second alternative embodiment of the invention.

FIG. 6 is another alternative embodiment of the invention wherein the central glide member is completely hollow, and aperture 24, which is open-ended, extends throughout the length of the glide member 1B.

Although specific embodiments of the invention have been described, it is understood that any drawer slide having an integrally molded plastic solid bearing central glide member is encompassed by the spirit of this invention.

What I claim as my invention is:

1. A drawer slide comprising:
    an elongate outer channel adapted to be affixed to a cabinet wall;
    an elongate inner channel adapted to be affixed to a drawer;
    an elongate integrally molded rigid plastic central glide;
    said central glide including an upper bearing surface and a lower bearing surface extending the length of said glide;
    each of said upper bearing surface and said lower bearing surface of said central glide comprising a single longitudinal central recess extending the length of said glide between longitudinal convex ridges;
    a portion of said glide lying between said upper bearing surface and said lower bearing surface comprising a web;
    said web being reinforced by a plurality of ribs;
    each of said outer and inner channels including upper and lower curvilinear in-turned flanges having an inner concave portion configured to said convex ridges;
    said upper and lower flanges being adapted, in operation, to directly matingly and slidably engage, respectively, said recess on said upper bearing surface and said recess on said lower bearing surface of said central glide.

2. A drawer slide as claimed in claim 1 wherein said central glide in cross-section has a substantially Z configuration.

3. A drawer slide as claimed in claim 2 wherein
    said web includes on one side adjacent said upper bearing surface, a first plurality of spaced apart reinforcing ribs and on the opposite side of said web, adjacent said lower bearing surface, a second plurality of spaced apart reinforcing ribs.

4. A drawer slide as claimed in claim 3 wherein said web has a plurality of spaced apart apertures along its length;
    said apertures being adapted to facilitate the mounting of said outer and inner channels to cabinet walls and drawers, respectively.

5. A drawer slide as claimed in claim 1 wherein said central glide in cross-section has a substantially X configuration.

6. A drawer slide as claimed in claim 1 wherein said central glide includes, on one side near a first end of said glide, a first integrally molded lateral projection, and on the opposite side near the opposite end of said glide, a second integrally molded lateral projection;
    each of said outer channel and said inner channel including an inwardly turned substantially horizontal projection in a centralized portion of a web;
    wherein, in operation, as a drawer is being opened, said projection on said outer channel is adapted to engage said first integrally molded lateral projection on said glide, and said projection on said inner channel is adapted to engage said second integrally molded lateral projection;
    the engagement of said projections acting as a limiting stop to limit the distance the drawer may be opened.

7. A drawer slide as claimed in claim 6 wherein each of said outer channel and said inner channel includes an in-turned end flange at one end;
said end flanges including bumpers thereon;
said end flanges being positioned at either end of said drawer slide when said drawer slide is assembled, such that in operation, when a drawer is being moved to a closed position, said in-turned end flanges act as limiting stops, limiting travel of said drawer into a cabinet.

8. A three-part drawer slide comprising:
an elongate outer channel adapted to be affixed to a cabinet wall;
an elongate inner channel adapted to be affixed to a drawer;
said channel members being identical to one another in dimension;
an elongate integrally molded rigid plastic central glide which, in cross section, has a substantially Z configuration;
said central glide including an upper bearing surface and a lower bearing surface extending the length of said glide;
each of said upper bearing surface and said lower bearing surface of said central glide comprising a single longitudinal central recess extending the length of said glide;
a portion of said glide lying between said upper bearing surface and said lower bearing surface comprising a web;
said web being reinforced by a plurality of ribs;
each of said outer and inner channels including upper and lower curvilinear in-turned flanges;
said upper and lower flanges being adapted, in operation, to directly matingly and slidably engage, respectively, said recess on said upper bearing surface and said recess on said lower bearing surface of said central glide.

9. A three-part drawer slide comprising:
an elongate outer channel adapted to be affixed to a cabinet wall;
an elongate inner channel adapted to be affixed to a drawer;
said channel members being equal to one another in dimension;
an elongate integrally molded rigid plastic central glide which, in cross section, has a substantially X configuration;
said central glide including an upper bearing surface and a lower bearing surface extending the length of said glide;
each of said upper bearing surface and said lower bearing surface of said central glide comprising a single longitudinal central recess extending the length of said glide;
a portion of said glide lying between said upper bearing surface and said lower bearing surface comprising a web, said web being reinforced by a plurality of ribs;
each of said outer and inner channel including upper and lower curvilinear in-turned flanges;
said upper and lower flanges being adapted, in operation, to directly matingly and slidably engage, respectively, said recess on said upper bearing surface and said recess on said lower bearing surface of said central glide.

* * * * *